UNITED STATES PATENT OFFICE.

AUGUST BLANK, ADOLF ISRAEL, AND MARTIN HERZBERG, OF ELBERFELD, GERMANY, ASSIGNORS TO THE FARBENFABRIKEN, VORMALS FR. BAYER & CO., OF SAME PLACE.

BLACK AZO DYE AND PROCESS OF MAKING SAME.

SPECIFICATION forming part of Letters Patent No. 561,694, dated June 9, 1896.

Application filed February 25, 1895. Serial No. 539,672. (Specimens.) Patented in England April 10, 1893, No. 7,330; in France May 2, 1893, No. 229,776, and in Austria-Hungary September 5, 1893, No. 3,397 and No. 3,282.

*To all whom it may concern:*

Be it known that we, AUGUST BLANK, ADOLF ISRAEL, and MARTIN HERZBERG, doctors of philosophy, chemists, assignors to the FARBENFABRIKEN, VORMALS FR. BAYER & CO., of Elberfeld, Prussia, Germany, residing at the same place, have invented a new and useful Improvement in the Manufacture of Black Azo Dye, (for which the aforesaid FARBENFABRIKEN, VORMALS FR. BAYER & CO. have already obtained Letters Patent in France, No. 229,776, dated May 2, 1893; in England, No. 7,330, dated April 10, 1893, and in Austria-Hungary, tom. 43, fol. 3,397, tom. 27, fol. 3,282, dated September 5, 1893;) and we do hereby declare the following to be an exact and clear description of our invention.

Our invention relates to the production of a new black azo dye, which consists in first producing the mixed dyestuff from one molecular proportion of the tetrazo compound of dianisidin or tolidin, one molecular proportion of amidonaphthol disulfo-acid ($NH_2 : SO_3H : SO_3H : OH = 1:3:6:8$) or an alkaline salt thereof, and one molecular proportion of a metadiamin—such as metaphenylenediamin or metatoluylenediamin—and in subsequently allowing one molecular proportion of diazotized acetyl paraphenylenediamin to act on the aforesaid mixed dyestuff. The dyestuff thus obtained produces on unmordanted cotton deep-black shades fast to the action of alkali and acid.

In carrying out our invention practically we can proceed as follows: 24.4 parts, by weight, of dianisidin are converted in the well-known manner into the tetrazo compound by means of fifty-five parts, by weight, of hydrochloric acid (20° Baumé) and 13.8 parts, by weight, of sodium nitrite. The so-formed tetrazo solution is stirred into a mixture prepared by dissolving 34.1 parts, by weight, of the acid sodium salt of amidonaphthol disulfo-acid ($NH_2 : SO_3H : SO_3H : OH = 1:3:6:8$) in three hundred and eighty parts, by weight, of water, with the addition of thirty-eight parts, by weight, of sodium carbonate, ($Na_2CO_3$,) the whole being well cooled down by means of ice.

The formation of the resulting intermediate product is complete after a short time—viz., when the liquid obtained by filtering a test portion of the reaction mixture and mixing the filtrate with an alkaline solution of the so-called "Schäffer's salt" gives no longer a dyestuff. If this stage is arrived at, the whole mass is acidulated by means of acetic acid, and eighteen parts, by weight, of metaphenylenediamin hydrochlorid, dissolved in a sufficient quantity of water, are added to the acetic-acid mixture. After standing and well stirring for about twelve hours the so-formed dyestuff, which is almost insoluble in cold water, is filtered off and mixed again with cold water to form a thin paste. Into this paste the diazo compound, prepared by diazotizing fifteen parts, by weight, of acetyl paraphenylenediamin in the well-known manner, are stirred, and the reaction mixture is then rendered alkaline by means of sodium-carbonate solution. In order to complete the formation of the dyestuff, four parts, by weight, of sodium hydroxid dissolved in twenty parts, by weight, of water are added, and the mass is carefully stirred. After about twelve hours the mixture is heated and the dyestuff is salted out by means of common salt and filtered off. It may be purified by redissolving in hot water and salting out. After filtering off, pressing, and drying the dyestuff, which corresponds, probably, with the formula—

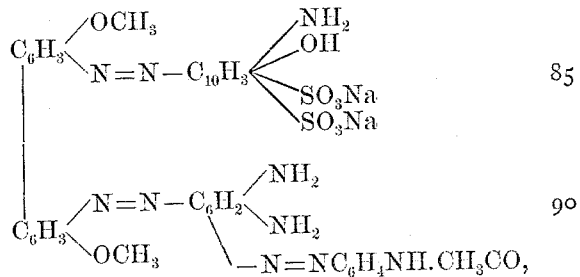

forms a black powder, soluble in water with a violet-black color, almost insoluble in alcohol, strong soda-lye and sodium-carbonate solution, soluble in ammonia liquor with a violet-black color. On adding dilute mineral acids to the solution of the dyestuff in water a violet-black precipitate is obtained. By concentrated sulfuric acid (66° Baumé) it is dissolved with a bluish-black color, a black precipitate being formed when the above sulfuric-acid solution is mixed with a large quantity of ice-water. The dyestuff produces on unmordanted cotton deep-black shades of great resistance to the action of alkali and acid. The same product is probably obtained if the intermediate product from one molecular proportion of tetrazotized dianisidin and one molecular proportion of the aforesaid amidonaphthol disulfo-acid (NH$_2$:SO$_3$H:SO$_3$H:OH = 1:3:6:8) is mixed in an acetic-acid solution with one molecular proportion of the chrysoidin-like product, which results from the combination of diazotized acetyl paraphenylenediamin with metaphenylenediamin, and if the resulting mixture is made alkaline with sodium carbonate and soda-lye according to the directions given in the above example.

Analogous dyestuffs result if, on the one hand, tolidin is used in place of dianisidin, or if the metaphenylenediamin is replaced by metatoluylenediamin.

Having now described our invention and in what manner the same is to be performed, what we claim as new, and desire to secure by Letters Patent, is—

1. The process for the production of substantive black azo dye which consists in combining one molecular proportion of tetrazotized dianisidin or tolidin first with one molecular proportion of amidonaphthol disulfo-acid (NH$_2$:SO$_3$H:SO$_3$H:OH = 1:3:6:8) or an alkaline salt thereof, then with one molecular proportion of a metadiamin (such as metaphenylenediamin or metatoluylenediamin) and in finally coupling the so-formed mixed dyestuff with one molecular proportion of diazotized acetyl paraphenylenediamin in the manner hereinbefore described.

2. As a new article of manufacture the new substantive black azo dye which may result from combining one molecular proportion of tetrazotized dianisidin or tolidin first with one molecular proportion of amidonaphthol disulfo-acid (NH$_2$:SO$_3$H:SO$_3$H:OH = 1:3:6:8) or an alkaline salt thereof then with one molecular proportion of a metadiamin (such as metaphenylenediamin or metatoluylenediamin) and in finally coupling the formed mixed dyestuff with one molecular proportion of diazotized acetyl paraphenylenediamin, in the manner as set forth which dye if dianisidin and metaphenylenediamin are employed has probably the following formula:

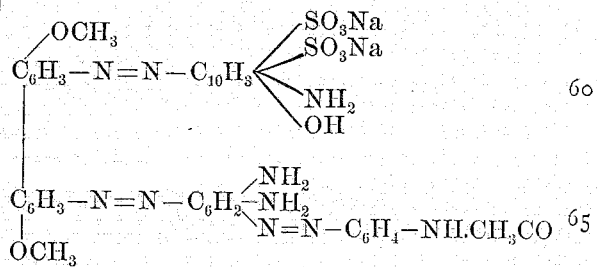

and is a black powder soluble in water with a violet-black color, dark flakes being precipitated when the watery solution is mixed with dilute mineral acids, almost insoluble in alcohol, strong soda-lye and sodium-carbonate solution, being dissolved by concentrated sulfuric acid (66° Baumé) with a bluish-black color, black flakes being precipitated on the addition of a large quantity of ice-water to the sulfuric-acid solution, producing on unmordanted cotton deep-black shades of great resistance to the action of alkali and acid.

In testimony whereof we have signed our names in the presence of two subscribing witnesses.

AUGUST BLANK.
ADOLF ISRAEL.
MARTIN HERZBERG.

Witnesses:
F. H. STRAUSS,
A. STRAUSS.